Figure 1:
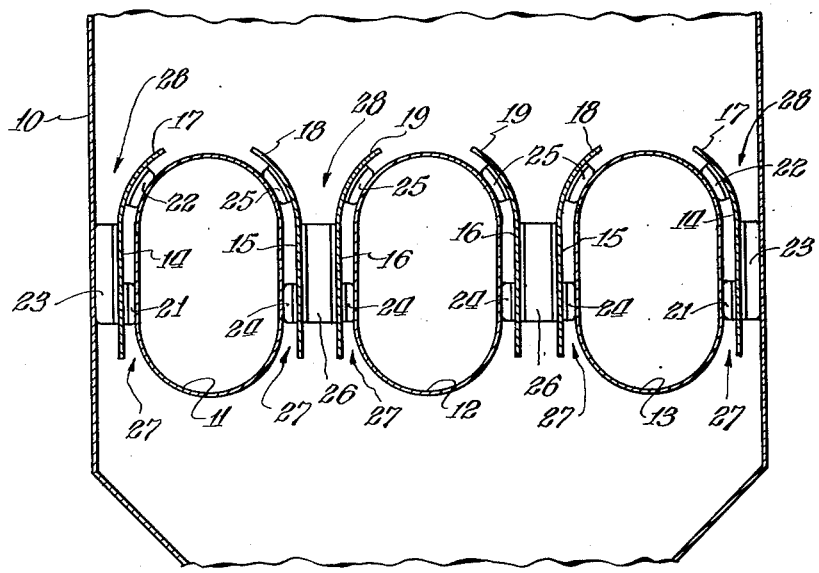

May 11, 1954

R. T. KEATING 2,678,039

DEEP FRYER

Filed Aug. 3, 1951

Inventor:
Richard T. Keating
By: Clarence J. Loftus
Attorney.

Patented May 11, 1954

2,678,039

UNITED STATES PATENT OFFICE 2,678,039

DEEP FRYER

Richard T. Keating, Chicago, Ill.

Application August 3, 1951, Serial No. 240,105

1 Claim. (Cl. 126—391)

This invention relates to deep fryers and has as its general aim the provision of a deep fryer wherein the thermal efficiency of the heating units is substantially greater than in fryers of conventional types. This increase in efficiency not only brings about an important reduction in the amount and cost of fuel required for a given fryer, but is of even greater importance in that it increases the cooking capacity of the fryer to a substantial extent by affording quicker heat recovery than heretofore attainable.

It is essential, however, that the increased heating efficiency be accomplished by means which do not bring about other disadvantages in practical operation.

It is, therefore, a primary object of the present invention to provide means whereby marked improvements in the heating efficiency of a deep fryer may be accomplished in a manner to avoid overheating and consequent unduly rapid breakdown of the cooking fat. A further object is to avoid any undue tendency toward discoloration of the interior surfaces of the cooking vessel or the heaters therein. Another closely related object is to accomplish the improved heat transfer without any burning or charring of the cooking fat or of food particles therein, such as might otherwise discolor, contaminate or have an adverse effect on the taste of foods being cooked in the vessel, and to permit any such food particles or other solid matter to be precipitated from any portion of the fryer into a relatively cool sump below the heaters, where there will be no tendency to burn, smoke, char or discolor.

The foregoing aims and objects are accomplished according to the present teachings by the provision of means whereby the cooking fluid within the vessel is caused to circulate and flow past the surfaces of the heaters more actively than in fryers of any previously known types. It appears that the efficiency of heat transfer between the burner and the cooking fluid depends not only upon the relative temperature of the heating surface as compared to the temperature of the fluid, but also upon the rate of flow of the fluid with respect to the heating surface. The applicant has therefore determined that by effecting a marked increase in the rate of flow of the fluid across the heating surfaces, it is not only possible to obtain a substantial increase in the efficiency of heat interchange therebetween, but it is also entirely feasible to operate such a deep fryer under conditions ordinarily encountered in actual practical use. By the invention, the fryer does not require excessively high heater temperatures, and thus avoids the tendency to overheat the cooking fluid or to discolor the surfaces of the burner or bring about deposits of carbonaceous matter on the burner surfaces.

It has been learned that the rate of flow of the cooking fluid across the surfaces of a heating unit may be substantially increased by the provision of a heat shield spaced closely alongside any vertical or ascending surface of the heating unit. The shield should be spaced from the heating surface just sufficiently to provide a thin, generally uniform channel immediately adjacent the heater, wherein the fluid flow will be accelerated by the action of convection, but the channel should not be thick enough to permit eddy currents or give rise to local recirculation within the channel. It will be understood that while the shields are closely spaced with respect to each other, yet their upper and lower edges are entirely free so that the channel is entirely unrestricted, and any crumbs or other solids carried into the channel by the fluid may precipitate into a sump at the bottom of the cooking vessel. It is also to be understood that adequate means for downward flow of the heating fluid are prvided between these shields, or in some other portion of the vessel.

It has long been known that the fats or cooking oils employed for deep frying expand considerably upon being heated, and it follows that the specific gravity of the hot fluid is much less than that of fluid a few degrees cooler, with the result that the heated fluid in the thin channel between the heaters and the shields will rise rapidly and be displaced with fluid of a cooler temperature entering the channels or ducts from the bottom thereof.

Thus, it has been learned that in any usual type of deep fryer, it is possible to effect important improvements in functioning merely by the provision of rising shields adjacent to but spaced somewhat away from the ascending or vertical heating surfaces ordinarily employed in such a unit, to provide a relatively thin but unobstructed channel therebetween.

Figure 2:
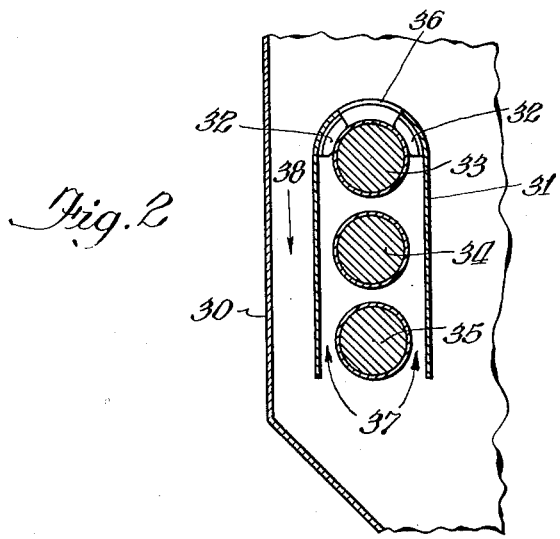

Two preferred embodiments of the invention are illustrated in the drawings of this specification, wherein:

Figure 1 is a cross sectional view of a deep fryer including hollow combustion tubes of a preferred type employed in gas or oil heated burners; and Figure 2 is a modified form of the invention, as applied to a fryer employing electrical heaters.

In Figure 1 the numeral 10 represents the vertical side wall of a deep frying vessel having combustion tubes 11, 12 and 13 extending horizontally therethrough. It has been learned that this type of construction provides one of the most satisfactory arrangements for gas or oil heating so far devised, and particularly satisfactory results have been obtained in practical use by employing a vessel about 14" square with three oval combustion tubes each about 3" wide and 5" in height.

The improvement to which the present invention relates resides in the shields, 14, 15 and 16, which are disposed beside and between the combustion tubes. These shields are preferably of a height about equivalent to the height of the combustion tubes, and should be spaced between ¼" and ¾" therefrom for best results. They are preferably curved inwardly over the upper portions of the tubes as indicated at 17, 18 and 19, respectively. The shields 14 are supported on a pair of flanges or brackets 21 and 22, which rest on the combustion tubes, and by one or more exterior flanged brackets 23, which rest against the walls 10. The shields 15 and 16 are spaced from the tubes by brackets 24 near their lower edges, and are held by brackets 25 adjacent their upper curved portions. The shields 15 and 16 are also spaced apart from each other by brackets 26, it being understood that the shields 15 and 16, with the brackets 24, 25 and 26, are all welded or otherwise secured together. Thus these parts comprise a subassembly or removable unit which need not be a permanent part of the cooking vessel, but which will rest in the position shown and be held in such position by gravity, and by the contact between the brackets 25 and the curved surfaces of the combustion tubes. These subassemblies can be removed from the vessel, however, merely by lifting out manually.

The shields 14 are also permanently secured to the brackets 21, 22 and 23 so that these units also comprise a unitary removable subassembly, the only difference being that the shields 14 are single units adapted to have one side thereof bear against the wall 10 of the vessel, while the shields 15 and 16 are double units designed to be positioned between two adjacent heater tubes.

The shields 14, 15 and 16 serve to divide the cooking vessel into relatively thin channels 27 between the shields and the adjacent walls of the combustion tubes, and somewhat thicker channels 28 between the pairs of shields or between the shields and the walls of the cooking vessel. Obviously, when the unit is in operation and the tubes 11, 12 and 13 are heated, the cooking fluid in the channels 27 will be heated to a temperature considerably exceeding the more remote fluid in the channels 28. This will immediately result in an upward flow of the fluid in the channels 27 and a corresponding downward flow through the channels 28, whereby a constant circulation of fluid is accomplished by convection.

A similar result is obtained in the modification of the invention illustrated in Figure 2, by the provision of an inverted U-shaped shield 31, fitted over a plurality of electrical heaters indicated as 33, 34 and 35, respectively. The shield has a pair of internal flanged brackets 32 positioned to rest on the uppermost heater. The top of the U-shaped bracket 31 is open as indicated at 36, to permit substantially unrestricted flow of the cooking fluid. Therefore, the vertical side walls of the bracket serve to define channels or ducts 37 in which upward flow of the heating fluid takes place, while downward flow of the cooler fluid is permitted through ducts 38 outside of the members 31. The fluid being heated is therefore permitted to flow not only beside the heaters 33, 34 and 35, but between them as well, so that the full area of the heating surface is utilized.

Also, as the fluid reaches the upper portion of the shields, it is directed inwardly over the curved upper surface of the uppermost heater 33 to remain in contact with the surface thereof throughout substantially the entire circumference. The same result is accomplished by the inwardly curved portions 17, 18 and 19 of the shields illustrated in Figure 1.

From the foregoing description it should be apparent that the teachings of this invention provide an extremely simple mechanical means for increasing the heating efficiency of a deep fryer by increasing the rate of flow of the cooking fluid with respect to the heat transfer surfaces of the vessel. Moreover, this is accomplished without the need of any pumps or mechanically moving parts, by the mere provision of suitable shields, which define fluid channels whereby the normal process of convection will effect the desired result. As pointed out in the objects of the invention, this improvement gives rise to important secondary advantages in several respects.

In the first place, it provides a marked increase in the cooking capacity of a given fryer for the reason that it reduces the time required for recovery of proper temperatures of the cooking fluid after the immersion of relatively cold food therein, and thus speeds up the cooking process to a marked degree. Moreover, it reduces the necessary temperature differential between the actual surface temperatures of the heating units and the fluid, so that the tendency of the heating surfaces to discolor is largely eliminated. This also largely overcomes the difficulties heretofore arising from scorching or burning of the fluid or of particles of food therein, and thus avoids discoloration, charring or other contamination of the cooking fluid and permits a longer period of use of the fluid in the fryer before replacement becomes necessary. With all of the above advantages, however, the devices described here do not interfere with the normal functioning of a fryer of presently known types. For one thing, conventional heating devices may be used. The shields are so designed that the channels are completely unobstructed and completely open at top and bottom, so that crumbs dislodged from food may be precipitated into the cooler fluid at the bottom of the vessel where there is little or no tendency to burn or char. Nevertheless, the shields may be easily and quickly removed to permit cleaning of the cooking vessel in the customary manner.

In view of the above, it is urged that the invention disclosed herein marks a real improvement in the deep fryer art, and it is pointed out that while two present embodiments of the invention are illustrated, it is understood to be capable of other variations and modifications, and that the scope of the inventive thought is to be regarded as limited only by the terms of the appended claim.

Having thus described my invention, what I claim as new and desire to secure by United States Letters Patent is:

A deep fryer comprising, in combination, an open frying vessel having a plurality of transverse, parallel heating tubes extending across the vessel and spaced substantially above the lower portion thereof, whereby cooking fluid in the lower portion of the vessel may remain relatively cool with respect to fluid at the level of the heating tubes; said heating tubes having their surfaces in direct contact with cooking fluid within said vessel and having thin sheet metal heat shields suspended on the heating tubes by spacing brackets; the heat shields consisting of vertical metal plates spaced closely adjacent to said heating surfaces; said shields having upper and lower edges spaced from the surfaces of the heating tubes and from each other and defining thin, open channels between the shields and tubes for upward flow of cooking fluid therebetween, with an additional open channel between said shields for downward flow of said fluid, whereby relatively hot cooking fluid is recirculated by convection in a zone around and above the level of the heating tubes.

References Cited in the file of this patent

UNITED STATES PATENTS

| Number | Name | Date |
|---|---|---|
| 1,264,740 | Young | Apr. 30, 1918 |
| 1,372,123 | De Cew | Mar. 22, 1921 |
| 2,061,533 | Anetsberger | Nov. 17, 1936 |
| 2,113,806 | Hubbard | Apr. 12, 1938 |
| 2,182,735 | O'Dowd | Dec. 5, 1939 |
| 2,251,111 | Brown | July 29, 1941 |
| 2,360,727 | Shaw | Oct. 17, 1944 |
| 2,535,905 | Dawson | Dec. 26, 1950 |

FOREIGN PATENTS

| Number | Country | Date |
|---|---|---|
| 459,332 | France | Sept. 2, 1913 |